United States Patent [19]

Tremblay et al.

[11] Patent Number: 5,776,536
[45] Date of Patent: Jul. 7, 1998

[54] REDUCED FAT CHOCOLATE AND METHOD OF MANUFACTURE

[75] Inventors: Paul A. Tremblay, Mercerville; Rajiv Mathur, Sewell, both of N.J.

[73] Assignee: Igen, Inc., Wilmington, Del.

[21] Appl. No.: 772,354

[22] Filed: Dec. 23, 1996

[51] Int. Cl.$^6$ .................. A23L 1/035; A23G 1/00
[52] U.S. Cl. .................. 426/660; 426/659; 426/593; 426/804; 426/601
[58] Field of Search .................. 426/659, 660, 426/593, 804, 601

[56] References Cited

U.S. PATENT DOCUMENTS

| | | | |
|---|---|---|---|
| 3,806,607 | 4/1974 | Whelan | 426/660 |
| 4,017,645 | 4/1977 | Ziccarelli | 426/660 |
| 4,895,452 | 1/1990 | Yournas | 246/4.1 |
| 4,948,600 | 8/1990 | Zumble | 426/659 |
| 5,013,497 | 5/1991 | Yournas | 264/4.1 |
| 5,147,723 | 9/1992 | Wallach | 428/402.2 |
| 5,160,669 | 11/1992 | Wallach et al. | 264/4.3 |
| 5,185,145 | 2/1993 | Loh | 426/659 |
| 5,190,786 | 3/1993 | Anderson | 426/660 |
| 5,234,635 | 8/1993 | Grollier | 264/4.6 |
| 5,234,767 | 8/1993 | Wallach | 428/402.2 |
| 5,256,422 | 10/1993 | Albert et al. | 424/450 |
| 5,258,109 | 11/1993 | Moore | 426/660 |
| 5,260,065 | 11/1993 | Mathur et al. | 424/450 |
| 5,360,621 | 11/1994 | Mentenk | 426/660 |
| 5,405,615 | 4/1995 | Mathur | 424/450 |
| 5,439,967 | 8/1995 | Mathur | 424/450 |
| 5,464,649 | 11/1995 | St John | 426/659 |
| 5,501,865 | 3/1996 | Zumble | 426/660 |
| 5,626,868 | 5/1997 | Moranceus | 424/450 |
| 5,683,740 | 11/1997 | Voultoury | 426/633 |

OTHER PUBLICATIONS

Wood et al., "Cocoa", *Consumption and Manufacture*, J. Wiley &Son, 4th Edition, pp. 590–595.

*Primary Examiner*—Carolyn Paden
*Attorney, Agent, or Firm*—Lahive & Cockfield, LLP

[57] ABSTRACT

A reduced fat chocolate preparation comprising lipid vesicles is disclosed. Also disclosed is a method of manufacturing the reduced fat chocolate preparation. The chocolate has less fat than regular chocolate and a higher percentage of water.

31 Claims, No Drawings

REDUCED FAT CHOCOLATE AND METHOD OF MANUFACTURE

BACKGROUND OF THE INVENTION

The present invention relates to a reduced fat chocolate preparation and to a method of making the chocolate.

Conventional methods of manufacturing chocolate involves a series of steps to develop flavor, incorporate ingredients, and achieve a fine texture. The process generally begins with cleaning and roasting cocoa beans which are then winnowed to separate the nib from the shell. The nib is then grounded to liquor which has a high fat content of about 55–58%.

To produce cocoa powder, the butter content of the nib liquor is generally reduced to about 22–23%. The nib is then ground in a mill and passed through a sieve to produce a fine powder which is insoluble in water, but which can be treated further by processes such as Dutching, to improve its dispersability in the final product.

To produce plain chocolate, the nib liquor is mixed with sugar, which has been conched, and additional cocoa butter to enable the chocolate to be molded. The ratio of nib liquor to sugar generally ranges from about 2:1 to 1:2. The chocolate blend is then mixed, ground, and conched (e.g., heated) to produce a smooth texture. Milk can then be added in a variety of forms (e.g., milk powder, condensed milk, milk fat etc.) to produce milk chocolate. Typical milk chocolate contains approximately 12%, nib liquor (55–58% of which is cocoa butter), 14% cocoa butter, 22% whole milk powder, 51.5% sugar and 0.5% lecithin. Finally, the chocolate is tempered (e.g., cooled) and then molded. An overview of chocolate manufacture is provided in *Consumption and Manufacure*, "Cocoa," G. A. R. Wood et al., (J. Wiley & Son, 4th ed.) pages 590–595.

Chocolate produced by this conventional method has the drawback of being high in fat (e.g., short chain fats and saturated fats) provided by both the cocoa butter (which constitutes approximately 21–35% of the total chocolate preparation) and the whole milk powder (which constitutes approximately 22% of the total concentration of the chocolate preparation). However, the fat content gives the chocolate its desirable physical characteristics, including its creamy texture, rich taste and ability to remain solid at room temperature while melting at body temperature (e.g., in the mouth).

Conventional methods of making chocolate are also labor and equipment intensive (e.g., involve grinding and conching).

A more simple method of making chocolate which uses less overall fat, particularly less saturated fat, yet retains the pleasing texture and taste of chocolate, would be beneficial.

SUMMARY OF THE INVENTION

The present invention features a reduced fat chocolate preparation and a method of manufacturing the chocolate using a blend of defatted chocolate and lipid vesicles. The defatted chocolate replaces the chocolate liquor (containing approximately 55–58% cocoa butter) regularly used to make chocolate, while the lipid vesicles replace a significant percent of the short-chain fats and saturated fats typically added to regular chocolate in the form of cocoa butter and/or whole milk solids, using longer chain, less saturated fats. The lipid vesicles also provide the chcocolate with a rich taste and smooth, creamy consistency. Overall, the chocolate preparation of the invention has both a lower total fat content and a lower saturated fat content than regular chocolate, yet still retains the desirable physical characteristics of regular chocolate, including taste and texture.

The lipid vesicles, which make up anywhere from about 50–90% (by weight) of the chocolate preparation, comprise a lipid phase and an aqueous phase. In general, the lipid phase makes up approximately 20–40% (by weight) of the lipid vesicles and the aqueous phase makes up the remaining 60–80%.

The components of the lipid phase include at least one fat (e.g., triglyceride or diglyceride) and at least one non-phospholipid surfactant. The lipid phase can, optionally, further contain one or more phospholipids and/or glycolipids. An edible charge producing agent, preferably an edible positive charge producing agent, can also be used in the lipid phase including, for example, fatty acids such as oleic acid and palmitic acid, phosphatidic acid, phosphatidyl serine, or any other suitable, edible charge producing agent.

Suitable fats for use in the lipid phase include edible fats which are known in the art to provide a creamy consistency and rich taste to foods and confections. Such fats include, for example, cocoa butter, milk butter and edible oils, such as soybean oil, corn oil, coconut oil, palm oil, palm kernel oil, and mixtures thereof. Generally, the fat makes up about 14–20% (by weight) of the lipid vesicles and about 10–20% (by weight) of the total chocolate preparation.

Suitable non-phospholipid surfactants for use in the lipid phase are members of the GRAS list of edible compounds and include, for example, derivatives of long chain fatty acids and long chain alcohols. Such suitable non-phospholipid surfactants include, for example, members of the BRIJ family of polyoxyethylene fatty ethers, the SPAN sorbitan fatty acid esters, and the TWEEN ethoxylated sorbitan fatty acid esters. All of the aforementioned surfactants are available from ICI Americas, Inc. of Wilmington, Del.

In one embodiment, the non-phospholipid surfactant is selected from the group consisting of sucrose distearate, glycerol monoesters, propylene glycol esters, polyoxyethylene fatty alcohols, polyoxyethylene derivatives of sorbitan fatty acid esters having 10–20 oxyethylene groups, and mixtures thereof. The fatty acids in the ester groups in the polyoxyethylene derivatives of sorbitan fatty acid esters can be selected from the group consisting of palmitic acid, stearic acid, lauric acid, and oleic acid, and mixtures thereof.

In a preferred embodiment, the lipid phase contains a blend of non-phospholipid surfactants including propylene glycol stearate, glycerol monostearate, and polyoxyethylene 20 sorbitan ester (Polysorbate 80). In a particularly preferred embodiment, oleic acid is also added to the lipid phase as a charge producing agent.

Suitable phospholipids and glycolipids for use in the lipid phase are members of the GRAS list of edible compounds and include, for example, quonivofyls, phosphatides, phosphatidylcholines (lecithins), phosphatidylethanolamines, phosphatidylserines, inositolphosphatides, and sphingomyelins. In a preferred embodiment of the invention, the phospholipid comes from soybean lecithins which can be purchased under the brand name ALCOLEC® LECITHINS. ALCOLEC® products are highly concentrated in the natural phospholipid components of soybean lecithins. Soybean lecithins which have been de-oiled (e.g., have a maximum oil content of about 2.0%) can also be used to further reduce the amount of fat in the chocolate preparation. For example, de-oiled soybean lecithins can be purchased in powder form under the brand name ALCOLEC® F-100.

To form the lipid phase, the above-described lipid components are blended at a sufficiently high temperature to melt the lipids and to achieve an even, homogenous mixture. In general, this temperature ranges from about 75°–95° C., preferably about 80°–90° C.

The aqueous phase of the lipid vesicles comprises a solution of a sweetener, typically a simple carbohydrate, and water. While sucrose is a preferred sweetener for use in the invention, other sweeteners such as glucose, dextrose, mannatose and fructose can also be used. Artificial sweeteners, e.g., saccharides, cyclamates, or aspartamine, may also be used. When using sucrose as the sweetener in the aqueous phase, a sucrose concentration of approximately 60–80%, preferably about 70–75% can be used to obtain sweeter chocolate. For less sweet (e.g., semi-sweet) chocolate, a sucrose concentration of approximately 40–60% can be used. For bitter chocolate, a sucrose concentration of 40% is appropriate. The sweetener (e.g., sucrose) is generally dissolved in water, preferably at a temperature of about 50°–70° C., avoiding the need for grinding or refining as is done in conventional methods of manufacturing chocolate.

The aqueous phase (or any other component of the chocolate preparation) can also contain food preservatives which are well known in the art. Suitable preservatives include, for example, potassium sorbate, sodium sorbate, potassium benzoate, sodium benzoate and calcium disodium EDTA. In one embodiment, a combination of methyl paraben and propyl paraben are added to the aqueous phase, as described in the examples below.

To form lipid vesicles for use in the chocolate preparation of the invention, the lipid phase and the aqueous phase are blended together. This can be achieved using many different techniques known in the art. In a preferred embodiment, the lipid phase and the aqueous phase are shear mixed as described in U.S. Pat. No. 4,895,452, entitled "*Method and Apparatus for Producing Lipid Vesicles*", the disclosure of which is incorporated herein by reference. The term "shear mixing," as used herein, means a shear equivalent to a relative flow of 5–50 m/s through a 1 mm orifice.

The lipid vesicles of the invention are paucilamellar vesicles, preferably having 2–10 lipid bilayers surrounding a central cavity. Certain fats and oils from the lipid phase (e.g., triglycerides and diglycerides) partition into central cavity of the vesicles, while the remaining phospholipids and non-phospholipid surfactants (e.g., monoglycerides) form the bilayers of the vesicles. The majority of the aqueous phase goes between the lipid bilayers of the vesicles and may also go into the central cavity, forming an emulsion or micelles with the water-insoluble fats and oils. When using phosphatides, such as soya phosphatides, as a source of phospholipids in the lipid phase, the phospholipids contained in the phosphatides may partition during manufacture of the vesicles to the lipid bilayers, while the remaining components of the phosphatides, such as oils (e.g., triglycerides and diglycerides), partition into the central cavity.

Once formed, the lipid vesicles of the invention are cooled to about 40°–50° C., preferably to about 45° C., and then blended with a form of chocolate, preferably defatted chocolate. The term "defatted chocolate," as used herein, includes any form of chocolate flavoring which has less total fat than that found in natural, chocolate nib liquor, regularly used to make chocolate. Preferably, the defatted chocolate is derived from the nib of cocoa beans which has had a portion or all of the fat (e.g., cocoa butter) removed. In a preferred embodiment, the defatted chocolate comprises defatted chocolate nib powder which can be purchased under the brand name Chocolate Essence™.

The defatted chocolate can be in any form, such as a powder or a liquor. In a preferred embodiment, the defatted chocolate is in the form of a dispersion (e.g., chcocolate powder dispersed in water) which is then mixed with the lipid vesicles. In general, the ratio of lipid vesicles to chocolate used is about 10:1 to 2:1 (by weight), preferably about 8:1 to 3:1 (by weight). Blending of the lipid vesicles and the chocolate can be achieved in any manner which results in a smooth, creamy, homogenous composition. In one embodiment, shear mixing is used.

The reduced fat chocolate of the invention can further contain one or more flavor or color additives, which include a variety of art-recognized compounds, such as edible oils, extracts and artificial flavors and colors which do not add significant fat to the preparation. For example, extracts of vanilla, coffee or mint can be added to flavor the chocolate preparation. If the flavorings and/or colorings are heat sensitive, then they are added concurrently with or following the step of mixing the defatted chocolate with the lipid vesicles (i.e., after cooling the lipid vesicles). If the flavorings and/or colorings are not heat sensitive, then they can be incorporated directly into the lipid vesicles as part of the aqueous phase if water-soluble, or as part of the lipid phase if water-insoluble.

Once formed, the reduced fat chocolate preparation can be molded into a desired shape or form before it cools to a point where it no longer flows (i.e., before cooling to room temperature).

The lipid vesicles of the invention can also be used as a fat substitute in other confectionary products for which a smooth texture and rich taste are desired.

Other modifications of the methods and products will be apparent from the following description and the claims.

DETAILED DESCRIPTION OF THE
INVENTION

The following Formulations will illustrate certain embodiments of the invention. Formulations 1–3 produce regular chocolate. Formulations 3–7 produce milk chocolate.

REDUCED FAT CHOCOLATE FORMULA 1
Lipid Phase Formed at 80°–90° C.

|  | percent | grams |
| --- | --- | --- |
| glycerol monostearate (Atmul) | 1.852 | 1.5 |
| propylene glycol stearate | 1.852 | 1.5 |
| soya phosphatides (Alcolec F 100) | 1.852 | 1.5 |
| polyoxyethylene 20 sorbitan ester (Polysorbate 80) | 0.309 | 0.25 |
| oleic acid | 0.309 | 0.25 |
| cocoa butter | 14.815 | 12.0 |
| Total Lipid | 20.98 | 17 |

Aqueous Phase Formed at 55°–65° C. (73% Sucrose Solution)

|  | percent | grams |
| --- | --- | --- |
| preservatives: | 21.32 | 17.28 |
| solution containing 0.2% methyl paraben & 0.03% propyl paraben sucrose | 57.69 | 46.74 |
| Total Aqueous Phase | 79.02 | 64.02 |
| Total Lipid Vesicle Preparation | 100.00 | 81.02 |

Procedure of Chocolate Manufacture:

Lipid vesicles were first formed by shear mixing the above lipid phase in two 60 mL syringes connected with a three-way stopcock (approximately twenty times) while cooling the syringes under running water until the preparation was about 45° C.

A sample containing 65.1 grams of lipid vesicles was then blended with 8 grams of Chocolate Essence® (defatted chocolate nib powder (50 micron)) dispersed in water, using two 60 mL syringes (shear mixing about 20 times until blended, as indicated by a uniform color and consistency).

The chocolate preparation was then poured into a mould and allowed to cool. The resulting chocolate had a sweet taste and a fairly firm consistency which did not flow at room temperature. The final concentrations of the chocolate were as follows:

|  | |
|---|---|
| Cocoa butter | 13.22 |
| Chocolate Essence | 10.94 |
| Sucrose | 51.37 |
| Water | 19.0 |
| Wall Lipids | 5.5 |
| Preservatives | 0.04 |

REDUCED FAT CHOCOLATE FORMULA 2

Lipid Phase formed at 80°–90° C.

|  | Percent | grams |
|---|---|---|
| glycerol monostearate (Atmul) | 1.852 | 1.5 |
| propylene glycol stearate | 1.852 | 1.5 |
| soya phosphatides (Alcolec F100) | 1.852 | 1.5 |
| polyoxyethylene 20 sorbitan ester (Polysorbate 80) | 0.309 | 0.25 |
| oleic acid | 0.309 | 0.25 |
| cocoa butter | 14.815 | 12.0 |
| Total Lipid | 20.98 | 17 |

Aqueous Phase formed at 55°–65° C.

|  | percent | grams |
|---|---|---|
| sucrose | 78.97 | 64 |
| preservatives: solution containing 0.2% methyl paraben & 0.03% propyl paraben | 0.05 | 0.04 |
| Total Aqueous Phase | 79.02 | 64.04 |
| Total Lipid Vesicle Preparation | 100.00 | 81.04 |

Procedure of Chocolate Manufacture:

Lipid vesicles were first formed by shear mixing the above lipid phase in two 60 mL syringes connected with a three-way stopcock (approximately twenty times) while cooling the syringes under running water until the preparation was about 45° C.

A sample containing 66.85 grams of lipid vesicles was then blended with 8 grams of Chocolate Essence® (defatted chocolate nib powder (50 micron)) dispersed in water, using two 60 mL syringes (shear mixing about 20 times until blended, as indicated by a uniform color and consistency).

The chocolate preparation was then poured into a mould and allowed to cool. The resulting chocolate had a sweet taste and a fairly firm consistency which did not flow at room temperature. The final concentrations of the chocolate were as follows:

|  | Percent |
|---|---|
| Cocoa butter | 13.23 |
| Chocolate Essence | 10.7 |
| Sucrose | 49.43 |
| Water | 21.14 |
| Wall Lipids | 5.5 |
| Preservatives: | 0.03 |

REDUCED FAT MILK CHOCOLATE FORMULA 3

Lipid Phase formed at 80°–90° C.

|  | percent | grams |
|---|---|---|
| glycerol monostearate (Atmul) | 1.940 | 1.5 |
| propylene glycol stearate | 1.940 | 1.5 |
| soya phosphatides (Alcolec F 100) | 1.940 | 1.5 |
| polyoxyethylene 20 sorbitan ester (Polysorbate 80) | 0.320 | 0.25 |
| oleic acid | 0.320 | 0.25 |
| milk butter fat | 15.516 | 12.0 |
| Total Lipid | 21.98 | 17 |

Aqueous Phase formed at 55°–65° C.

|  | percent | grams |
|---|---|---|
| sucrose | 77.97 | 60.3 |
| preservatives: solution containing 0.2% methyl paraben & 0.03% propyl paraben | 0.05 | 0.04 |
| Total Aqueous Phase | 78.02 | 60.34 |
| Total Lipid Vesicle Preparation | 100.00 | 77.34 |

Procedure of Chocolate Manufacture:

Lipid vesicles were first formed by shear mixing the above lipid phase in two 60 mL syringes connected with a three-way stopcock (approximately twenty times) while cooling the syringes under running water until the preparation was about 45° C.

A sample containing 66.85 grams of lipid vesicles was then blended with 8 grams of Chocolate Essence® (defatted chocolate nib powder (50 micron)) dispersed in water, using two 60 mL syringes (shear mixing about 20 times until blended, as indicated by a uniform color and consistency).

The chocolate preparation was then poured into a mould and allowed to cool. The resulting chocolate had a sweet taste and a fairly firm consistency which did not flow at room temperature. The final concentrations of the chocolate were as follows:

|  | Percent |
|---|---|
| Milk Butter Fat | 13.0 |
| Chocolate Essence | 16.6 |
| Sucrose | 48.75 |
| Water | 16.0 |
| Wall Lipids | 5.62 |
| Preservatives: | 0.03 |

REDUCED FAT MILK CHOCOLATE FORMULA 4

Lipid Phase formed at 80°–90° C.

|  | percent | grams |
|---|---|---|
| glycerol monostearate (Atmul) | 4.073 | 3.0 |
| propylene glycol stearate | 4.073 | 3.0 |
| soya phosphatides (Alcolec F100) | 4.073 | 3.0 |
| polyoxyethylene 20 sorbitan ester (Polysorbate 80) | 0.679 | 0.5 |
| oleic acid | 0.679 | 0.5 |
| milk butter fat | 16.29 | 12.0 |
| Total Lipid | 29.87 | 22 |

Aqueous Phase formed at 55°–65° C.

|  | percent | grams |
|---|---|---|
| sucrose | 70.08 | 51.62 |
| preservatives: solution containing 0.2% methyl paraben & 0.03% propyl paraben | 0.05 | 0.04 |
| Total Aqueous Phase | 70.13 | 51.66 |
| Total Lipid Vesicle Preparation | 100.00 | 73.66 |

Procedure of Chocolate Manufacture:

Lipid vesicles were first formed by shear mixing the above lipid phase in two 60 mL syringes connected with a three-way stopcock (approximately twenty times) while cooling the syringes under running water until the preparation was about 45° C.

A sample containing 50.0 grams of lipid vesicles was then blended with 10 grams of Chocolate Essence® (defatted chocolate nib powder (50 micron)) dispersed in water, using two 60 mL syringes (shear mixing about 20 times until blended, as indicated by a uniform color and consistency).

The chocolate preparation was then poured into a mould and allowed to cool. The resulting chocolate had a sweet taste and had a very firm consistency. The final concentrations of the chocolate were as follows:

|  | Percent |
|---|---|
| Milk Butter Fat | 13.23 |
| Chocolate Essence | 10.7 |
| Sucrose | 49.43 |
| Water | 21.14 |
| Wall Lipids | 5.5 |
| Preservatives | 0.03 |

REDUCED FAT MILK CHOCOLATE FORMULA 5

Lipid Phase formed at 80°–90° C.

|  | Percent | grams |
|---|---|---|
| glycerol monostearate (Atmul) | 4.16 | 3.0 |
| propylene glycol stearate | 4.16 | 3.0 |
| soya phosphatides (Alcolec F100) | 4.16 | 3.0 |
| polyoxyethylene 20 sorbitan ester (Polysorbate 80) | 0.694 | 0.5 |
| oleic acid | 0.694 | 0.5 |
| milk buffer fat | 16.66 | 12.0 |
| Total Lipid | 30.54 | 22 |

Aqueous Phase formed at 55°–65° C.

| (60% sucrose solution) | | |
|---|---|---|
| sucrose | 69.42 | 50.0 |
| preservatives: solution containing 0.2% methyl paraben & 0.03% propyl paraben | 0.042 | 0.03 |
| Total Aqueous Phase | 69.46 | 50.03 |
| Total Lipid Vesicle Preparation | 100.00 | 72.03 |

Procedure of Chocolate Manufacture:

Lipid vesicles were first formed by shear mixing the above lipid phase in two 60 mL syringes connected with a three-way stopcock (approximately twenty times) while cooling the syringes under running water until the preparation was about 45° C.

A sample containing 50.0 grams of lipid vesicles was then blended with 10 grams of Chocolate Essence® (defatted chocolate nib powder (50 micron)) dispersed in water, using two 60 mL syringes (shear mixing about 20 times until blended, as indicated by a uniform color and consistency).

The chocolate preparation was then poured into a mould and allowed to cool. The resulting chocolate had a semi-sweet taste and a very firm consistency. The final concentrations of the chocolate were as follows:

|  | Percent |
|---|---|
| Milk Butter Fat | 13.04 |
| Chocolate Essence | 21.74 |
| Sucrose | 32.61 |
| Water | 21.74 |
| Wall Lipids | 10.85 |
| Preservatives | 0.02 |

REDUCED FAT MILK CHOCOLATE FORMULA 6

Lipid Phase formed at 80°–90° C.

|  | Percent | grams |
|---|---|---|
| glycerol monostearate (Atmul) | 5.00 | 3.0 |
| propylene glycol stearate | 5.00 | 3.0 |
| soya phosphatides (Alcolec F100) | 5.00 | 3.0 |
| polyoxyethylene 20 sorbitan ester (Polysorbate 80) | 0.833 | 0.5 |
| oleic acid | 0.833 | 0.5 |
| milk butter fat | 20.00 | 12.0 |
| Total Lipid | 36.65 | 22 |

Aqueous Phase formed at 55°–65° C.

| (60% sucrose solution) | | |
|---|---|---|
| sucrose | 63.29 | 38.0 |
| preservatives: solution containing 0.2% methyl paraben & 0.03% propyl paraben | 0.033 | 0.02 |
| Total Aqueous Phase | 63.32 | 38.02 |
| Total Lipid Vesicle Preparation | 100.00 | 60.02 |

Procedure of Chocolate Manufacture:

Lipid vesicles were first formed by shear mixing the above lipid phase in two 60 mL syringes connected with a three-way stopcock (approximately twenty times) while cooling the syringes under running water until the preparation was about 45° C.

A sample containing 50.0 grams of lipid vesicles was then blended with 10 grams of Chocolate Essence® (defatted chocolate nib powder (50 micron)) dispersed in water, using two 60 mL syringes (shear mixing about 20 times until blended, as indicated by a uniform color and consistency).

The chocolate preparation was then poured into a mould and allowed to cool. The resulting chocolate had a semi-sweet taste and a very firm consistency. The final concentrations of the chocolate were as follows:

|  | Percent |
|---|---|
| Milk Butter Fat | 15. |
| Chocolate Essence | 25 |
| Sucrose | 19. |
| Water | 29 |
| Wall Lipids | 12 |
| Preservatives | 0.02 |

REDUCED FAT MILK CHOCOLATE FORMULA 7

Lipid Phase formed at 80°–90° C.

| (60% sucrose solution) | Percent | grams |
|---|---|---|
| glycerol monostearate (Atmul) | 5.00 | 3.0 |
| propylene glycol stearate | 5.00 | 3.0 |
| soya phosphatides (Alcolec F100) | 5.00 | 3.0 |
| polyoxyethylene 20 sorbitan ester (Polysorbate 80) | 0.833 | 0.5 |
| oleic acid | 0.833 | 0.5 |
| milk butter fat | 20.00 | 12.0 |
| Total Lipid | 36.65 | 22 |

Aqueous Phase formed at 55°–65° C.

| sucrose | 63.29 | 38.0 |
|---|---|---|
| preservatives: solution containing 0.2% methyl paraben & 0.03% propyl paraben | 0.033 | 0.02 |
| Total Aqueous Phase | 63.32 | 38.02 |
| Total Lipid Vesicle Preparation | 100.00 | 60.02 |

Procedure of Chocolate Manufacture:

Lipid vesicles were first formed by shear mixing the above lipid phase in two 60 mL syringes connected with a three-way stopcock (approximately twenty times) while cooling the syringes under running water until the preparation was about 45° C.

A sample containing 45.0 grams of lipid vesicles was then blended with 15 grams of Chocolate Essence® (defatted chocolate nib powder (50 micron)) dispersed in water, using two 60 mL syringes (shear mixing about 20 times until blended, as indicated by a uniform color and consistency).

The chocolate preparation was then poured into a mould and allowed to cool. The resulting chocolate had a bitter taste and a very firm consistency. The final concentrations of the chocolate were as follows:

| Final Concentrations | Percent |
|---|---|
| Milk Butter Fat | 15 |
| Chocolate Essence | 25 |
| Sucrose | 9.5 |

| Final Concentrations | Percent |
|---|---|
| Water | 37.98 |
| Wall Lipids | 12.5 |
| Preservatives | 0.02 |

*upon microscopic examination, the lipid vesicles in the chocolate preparation appeared uniform and small in size, and spherical in shape The foregoing Examples are merely illustrative and those skilled in the art may be able to determine other materials and methods which accomplish the same results. Such other materials and methods are included within the following claims.

What is claimed is:

1. A reduced fat chocolate preparation comprising a blend of:

(a) defatted chocolate; and
   (b) lipid vesicles comprising a lipid phase and an aqueous phase wherein said lipid phase comprises a mixture of an edible fat and at least one edible non-phospholipid surfactant selected from the group consisting of sucrose distearate, glycerol monoesters, propylene glycol esters, polyoxyethylene fatty alcohols, polyoxyethylene derivatives of sorbitan fatty acid esters having 10–20 oxyethylene groups, and mixtures thereof; wherein the fatty acids in the ester groups in the polyoxyethylene derivatives of sorbitan fatty acid esters are selected from the group consisting of palmitic acid, stearic acid, lauric acid, and oleic acid, and mixtures thereof, and wherein said aqueous phase comprises a mixture of a sweetener and water.

2. The chocolate preparation of claim 1 wherein said fat in said lipid phase is selected from the group consisting of cocoa butter, milk butter fat and edible oils.

3. The chocolate preparation of claim 1 wherein said at least one edible non-phospholipid surfactant in said lipid phase is selected from the group consisting of propylene glycol stearate, glycerol monostearate, sucrose distearate, and polyoxyethylene 20 sorbitan ester, and mixtures thereof.

4. The chocolate preparation of claim 1 wherein said lipid phase further comprises at least one edible phospholipid.

5. The chocolate preparation of claim 4 wherein said phospholipid is supplied by soya phosphatides.

6. The chocolate preparation of claim 1 wherein said lipid phase further comprises at least one charge producing agent.

7. The chocolate preparation of claim 6 wherein said simple carbohydrate is sucrose.

8. The chocolate preparation of claim 1 wherein said sweetener in said aqueous phase comprises a simple carbohydrate.

9. The chocolate preparation of claim 1 further comprising a preservative.

10. The chocolate preparation of claim 1 further comprising a flavor additive.

11. The chocolate preparation of claim 1 wherein said defatted chocolate comprises a solution of defatted chocolate nib powder dispersed in water.

12. The chocolate preparation of claim 1 wherein said lipid vesicles are paucilamellar lipid vesicles.

13. A reduced fat chocolate preparation comprising a blend of:

(a) defatted chocolate; and
   (b) lipid vesicles comprising a lipid phase and an aqueous phase wherein said lipid phase comprises a mixture of: a fat selected from the group consisting of cocoa butter and milk butter, at least one edible non-phospholipid surfactant selected from the group consisting of sucrose distearate, glycerol monostearate, propylene glycol stearate, sorbitan monooleate, and mixtures thereof; and oleic acid; and wherein said aqueous phase comprises a mixture of sucrose and water.

14. The chocolate preparation of claim 13 wherein said lipid phase further comprises at least one phosphatide.

15. The chocolate preparation of claim 13 wherein said lipid vesicles are paucilamellar vesicles having 2–10 lipid bilayers separated by said aqueous phase.

16. A method of preparing reduced fat chocolate comprising the steps of:

(a) forming a lipid phase comprising a mixture of an edible fat and at least one edible non-phospholipid surfactant selected from the group consisting of sucrose distearate, glycerol monoesters, propylene glycol esters, polyoxyethylene fatty alcohols, polyoxyethylene derivatives of sorbitan fatty acid esters having 10–20 oxyethylene groups, and mixtures thereof, wherein the fatty acids in the ester groups in the polyoxyethylene derivatives of sorbitan fatty acid esters are selected from the group consisting of palmitic acid, stearic acid, lauric acid, and oleic acid, and mixtures thereof;

(b) forming an aqueous phase comprising a sweetener and water;

(c) shear mixing said lipid phase with said aqueous phase to form lipid vesicles; and (d) blending said lipid vesicles with defatted chocolate to form a reduced fat chocolate preparation.

17. The method of claim 16 wherein said lipid phase is formed by mixing said fat, said phospholipid and said non-phospholpid surfactant at a temperature of about 70°–100° C.

18. The method of claim 16 wherein said fat is selected from the group consisting of cocoa butter, milk butter, and edible oils.

19. The method of claim 16 wherein said it least one edible non-phospholipid surfactant in said lipid phase is selected from the group consisting of propylene glycol stearate, glycerol monostearate, sucrose distearate, and polyoxyethylene 20 sorbitan ester, and mixtures thereof.

20. The method of claim 16 wherein said lipid phase further comprises at least one edible phospholipid.

21. The method of claim 20 wherein said phospholipid is supplied by phosphatides.

22. The method of claim 16 wherein said sweetener in said aqueous phase is sucrose.

23. The method of claim 16 wherein said defatted chocolate comprises defatted chocolate nib powder.

24. The method of claim 16 further comprising the step of adding a preservative to said reduced fat chocolate preparation.

25. The method of claim 24 wherein said preservative is added to said aqueous phase.

26. The method of claim 16 further comprising the step of adding a color or flavor additive to said reduced fat chocolate preparation.

27. The method of claim 16 further comprising the step of moulding said reduced fat chocolate preparation into a desired shape.

28. The method of claim 16 further comprising the step of adding a charge producing agent to the lipid phase.

29. The method of claim 28 wherein the charge producing agent is oleic acid.

30. A fat substitute for use in a confectionary comprising lipid vesicles having a lipid phase and an aqueous phase;

wherein said lipid phase comprises a mixture of: (a) a fat selected from the group consisting of cocoa butter and milk butter; and (b) at least one edible non-phospholipid surfactant selected from the group consisting of sucrose distearate, glycerol monostearate, propylene glycol stearate, sorbitan monooleate, and mixtures thereof; and oleic acid; and wherein said aqueous phase comprises a mixture of a sweetener and water.

31. A reduced fat confectionary product having a smooth texture and a rich taste, said confectionary product comprising lipid vesicles having:

(a) a lipid phase comprising a mixture of an edible fat, and at least one edible non-phospholipid surfactant selected from the group consisting of sucrose distearate, glycerol monoesters, propylene glycol esters, polyoxyethylene fatty alcohols, polyoxyethylene derivatives of sorbitan fatty acid esters having 10–20 oxyethylene groups, and mixtures thereof, wherein the fatty acids in the ester group in the polyoxyethylene derivatives of sorbitan fatty acid esters are selected from the group consisting of palmitic acid, stearic acid, lauric acid, and oleic acid, and mixtures thereof; and (b) an aqueous phase comprising a sweetener and water.

* * * * *